United States Patent
Lanzer (10) Patent No.: US 7,059,229 B2
(45) Date of Patent: Jun. 13, 2006

(54) COUNTERBALANCED ADVANCING METAL CUTTING SAW

(75) Inventor: Delmar Lanzer, Woodburn, IN (US)

(73) Assignee: Leatha Blazetic, Fort Wayne, IN (US)

( * ) Notice: Subject to any disclaimer, the term of this patent is extended or adjusted under 35 U.S.C. 154(b) by 0 days.

(21) Appl. No.: 10/853,303

(22) Filed: May 25, 2004

(65) Prior Publication Data

US 2005/0000341 A1   Jan. 6, 2005

Related U.S. Application Data

(62) Division of application No. 09/751,645, filed on Dec. 29, 2000, now abandoned.

(51) Int. Cl.
*B23D 45/04* (2006.01)
(52) U.S. Cl. .............. 83/493; 83/490; 83/491
(58) Field of Classification Search .......... 83/490, 83/491, 573, 483, 487, 488, 489, 485
See application file for complete search history.

(56) References Cited

U.S. PATENT DOCUMENTS

| | | | | |
|---|---|---|---|---|
| 1,730,938 A | * | 10/1929 | Otto et al. ............ | 83/165 |
| 2,393,617 A | * | 1/1946 | De Spain ............. | 83/212 |
| 3,685,211 A | * | 8/1972 | Marchand ............ | 451/28 |
| 3,802,474 A | * | 4/1974 | Fell .................... | 144/133.1 |
| 3,827,325 A | * | 8/1974 | Ward et al. .......... | 83/461 |
| 4,022,092 A | * | 5/1977 | Scheib et al. ........ | 83/306 |
| 4,163,404 A | * | 8/1979 | Lavis .................. | 83/165 |
| 4,335,637 A | * | 6/1982 | Kaltenbach .......... | 83/452 |
| 4,365,530 A | * | 12/1982 | Johnson et al. ...... | 83/490 |
| 4,581,967 A | * | 4/1986 | Ehm et al. ........... | 83/452 |
| 4,817,245 A | * | 4/1989 | Melville .............. | 452/148 |

FOREIGN PATENT DOCUMENTS

JP          51137187 A      11/1976

* cited by examiner

*Primary Examiner*—Allan N Shoap
*Assistant Examiner*—Omar Flores-Sánchez
(74) *Attorney, Agent, or Firm*—Baker & Daniels LLP (57) ABSTRACT

An advancing power saw used for any metal cutting application. The power saw is provided with an oscillating mechanism that drives the saw up and down in a vertical direction. A hydraulic cylinder advances the saw toward the metal being cut while the saw is oscillating creating a circular pathway for the saw blade during the cutting operation. A balancing apparatus is provided in association with the saw blade that advances in an opposite direction to that of the saw blade to act as a counterbalance for the saw. The balancing apparatus has a weight provided at one end which dampens the vibrations created by the saw during the cutting operation and substantially equalizes pressure on the saw blade.

8 Claims, 10 Drawing Sheets

COUNTERBALANCED ADVANCING METAL CUTTING SAW

This application is a divisional of U.S. application Ser. No. 09/751,645, filed on Dec. 29, 2000 now abandoned.

BACKGROUND OF THE INVENTION

1. Field of Invention.

The present invention relates to power saws used for any metal cutting application. More particularly, the field of the invention involves such power saws used for cutting metal objects such as railroad rails used in railroad joints.

2. Description of the Related Art

In general, metal objects such as railroad rails, engine blocks, and stainless steel rods are cut for several purposes including forming railroad joints and material testing. These types of metals are conventionally cut by power saws. Conventional power saws include a saw blade that is driven by a belt coupled to a relatively high horsepower motor. The saw blade is advanced downwardly at a constant rate toward the piece of metal by a hydraulic cylinder or the like. Another feature of conventional power saws used to cut metal is an oscillating device which provides the saw blade with an oscillatory motion as it advances through the metal object. The saw blade follows a circular path as it cuts through the metal.

Power saws lacking an oscillating device maintain the blade in constant contact with the metal being cut. The temperature of the metal article at the point of contact thus elevates becoming too hot and alters the integrity of the metal. Further, due to the high temperatures, the saw blade tends to cut towards the hotter areas of the metal as it is being forced through the object. The resulting cut surface of the metal then has ridges and is not substantially flat which prevent uniform contact of the cut surfaces of two adjacent railroad rails in a railroad joint for example. The life of the saw blade is reduced in this type of power saw because of the stress applied to the blade from the force of the blade in constant contact with the metal being cut. Power saws having oscillating devices dissipate the heat created by the cutting operation so that the integrity of the metal does not change. However, the oscillatory motion of the saw blade is not controlled in a smooth, continuous motion which prevents dissipation of the heat created during cutting, thereby allowing the integrity of the metal to change. Once this occurs, the horsepower requirements necessary to force the saw through the remainder of the piece of metal being cut as well as the stress applied to the saw blade increase drastically.

Conventional power saws for cutting metal objects lack control of the vibrations created during the cutting operation. Such conventional saws lack speed desired for the cutting operation. Further, conventional power saws require frequent replacement of the saw blade.

SUMMARY OF THE INVENTION

The present invention involves a counterbalanced, oscillating advancing power saw capable of cutting several types of metal. The power saw includes an oscillating motor which oscillates the saw blade vertically. The saw also includes a hydraulic cylinder which forces the saw blade toward the piece of metal being cut. A counterbalance is arranged to move in the opposite direction of the saw as its blade advances towards the metal to facilitate an approximately constant cutting pressure as the saw blade advances. The saw also includes a rotating platform which allows the cut through the metal to be at any desirable angle up to 45 degrees left or right from center.

The present invention provides an advancing power saw for cutting metal objects. The power saw has a platform and a saw support plate which is disposed on the platform. A saw blade assembly is disposed upon the support plate and includes a saw blade coupled with a motor and associated with an oscillating mechanism. A counterweight is operatively associated with the support plate and arranged to move in a direction opposite to the direction the support plate moves.

In an exemplary embodiment, the power saw includes an advancing mechanism for advancing and retracting the support plate. A pulley system is coupled to the counterweight and the support plate such that the pulley system advances the counterweight in an equal and opposite direction of the support plate. The counterweight is made of a plurality of rails where at least one of the plurality of rails is operatively connected to the support plate, and at least one of the plurality of rails is operatively connected to the counterweight, such that the rails actuate in opposite directions. The counterweight has sufficient mass in relation to the power saw to dampen vibrations in the power saw and equalize the pressure on the saw blade. The power saw further includes at least one hydraulic cylinder is associated with the rails to facilitate the cutting stroke and return stroke of the saw assembly. For lateral movement of the saw assembly, at least one hydraulic cylinder is associated with the counterweight and at least one hydraulic cylinder is associated with the support plate. The oscillating mechanism includes an oscillating motor with is associated with the oscillating mechanism by a connecting arm. The support plate and the counterweight are supported by at least one pivot support disposed atop the platform. The pivot support is disposed beneath the rails. The pivot support extends above the rails.

In another form, the present invention provides an advancing power saw for cutting metal objects including a platform having a movable support plate. Further included is an oscillating saw operation for cutting the metal objects disposed on the support plate and a balancing operation for dampening vibration of the oscillating saw operation.

In an exemplary embodiment, the oscillating saw operation includes a saw blade rotatably supported atop the support plate. At least one pivot support is provided to support the support plate above the platform. The pivot support is disposed beneath the rails. The pivot support extends above the rails. The oscillating saw operation is operatively associated with an oscillating motor by a connecting arm. An advancing mechanism is provided and is operatively associated with the support plate such that the advancing mechanism advances and retracts the saw blade. The balancing operation is operatively associated with the support plate and arranged to move in a direction opposite to the direction the support plate moves. The balancing operation includes a plurality of rails, at least one of which is operatively connected to the support plate, and at least one of which is operatively connected to the balancing operation. The power saw further includes at least one hydraulic cylinder which is associated with the rails. At least one hydraulic cylinder is associated with the balancing operation and at least one hydraulic cylinder is associated with the support plate. The balancing operation supports at one end a counterbalance which dampens vibrations in the power saw and is a weight. The counterbalance further equalizes pressure on the saw blade. Further included in the oscillating saw operation is a pulley assembly coupled to the balancing operation and to the support plate to advance the balancing operation in a direction opposite of the support plate.

An advantage of the power saw of the present invention is that by oscillating the saw blade, the contact point between the blade and the metal is not constant to create high temperatures, eliminating the possibility of altering the integrity of the metal. Another advantage of the power saw is the balancing apparatus which counterbalances the weight of the saw blade to control vibrations produced during the cutting operation and substantially equalizes pressures on the saw blade. This lengthens the life of the saw blade and allows the metal to be cut faster.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise form disclosed in the following detailed description. Rather, the embodiments are chosen and described so that others skilled in the art may utilize their teachings.

Figure 1:
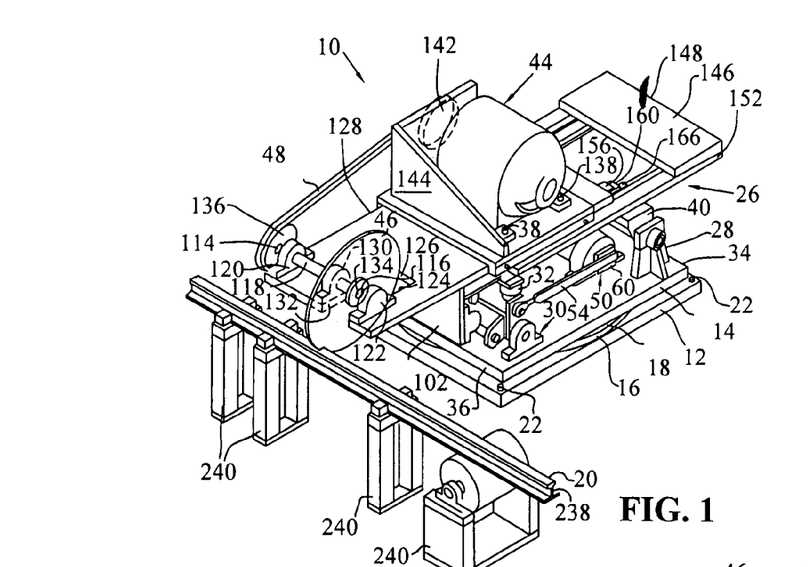
FIG. 1 is a perspective view of the power saw of the present invention.
Figure 2:
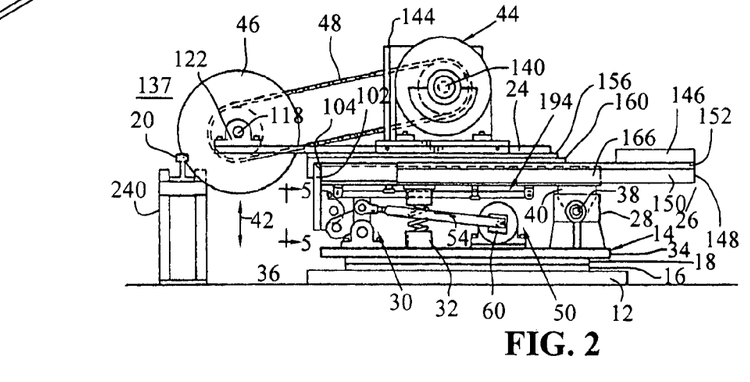
FIG. 2 is a side elevation of the power saw of FIG. 1.

Referring to FIGS. 1 and 2, advancing power saw 10 is used for cutting a plurality of types of metal including cast iron engine blocks, stainless steel rods and railroad rail 20. Railroad rail 20 is illustrated in the figures and discussed below as an example of the type of metal that can be cut by power saw 10. Power saw 10 is supported by base 12 upon which rotatable platform 14 is mounted. Base 12 and platform 14 are both constructed from a material such as steel possessing strength properties to support the weight of power saw 10. As shown in FIG. 2, between base 12 and 14 are fixed disk 16 and movable disk 18 also constructed from a material such as steel and stacked atop one another. Fixed disk 16 is secured to base 12 and movable disk 18 is attached to platform 14 by any suitable means such as welding or the use of fasteners. Movable disk 18 is rotatably mounted with respect to fixed disk 16 so as to permit rotation of platform 14 and thus power saw 10, allowing rail 20 to be cut at any desired angle. Optionally, a power positioning device, e.g. a hydraulic or electric motor, may drive the rotation of platform 14. Thus, such a saw assembly could be accessible from any direction, allowing for the saw assembly to be used on more than one production line. Base 12 is fixed to the floor in the area where power saw 10 is being used by fasteners 22 such as bolts or screws.

Advancing power saw 10 includes saw support plate 24 mounted atop and movable in relation to balancing apparatus 26 as illustrated in FIGS. 1, 2, 11, 12, and 13. Saw support plate 24 and balancing apparatus 26 are held above platform 14 by a pair of pivot supports 28, oscillating mechanism 30 and a pair of springs 32. Pivot supports 28 are secured to the top surface of platform 14 by suitable methods such as welding or brazing and are disposed on both sides of end 34 of platform 14 to support the width of saw support plate 24 and balancing apparatus 26. At end 36 of platform 14 is oscillating mechanism 30 which supports saw support plate 24 and balancing apparatus 26 and causes the up and down movement of power saw 10 in the direction of arrow 42. Pivot supports 28 have apertures 38 in which the ends of beam 40 are journalled for rotation. As oscillation mechanism 30 moves power saw 10 up and down in the direction of arrow 42, beam 40 supporting balancing apparatus 26 (FIGS. 1, 2, 6 and 7) acts as a pivots about which saw support plate 24 and balancing apparatus 26 rotate. Oscillating mechanism 30 will be discussed in greater detail below. Also supporting plate 24 and balancing apparatus 26 are a pair of springs 32 disposed on the top surface of platform 14 between pivot supports 28 and oscillating mechanism 30. Springs 32 help facilitate and maintain the oscillatory motion of power saw 10 created by oscillating mechanism 30. Springs 32 could also be a device such as a hydraulic cylinder.

Figure 3:
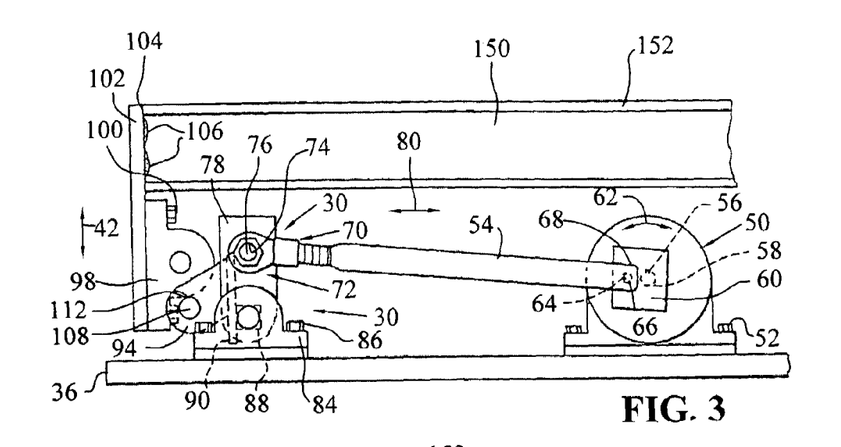
FIG. 3 is an enlarged, sectional view showing the oscillating mechanism of the present invention in the initial position.
Figure 4:
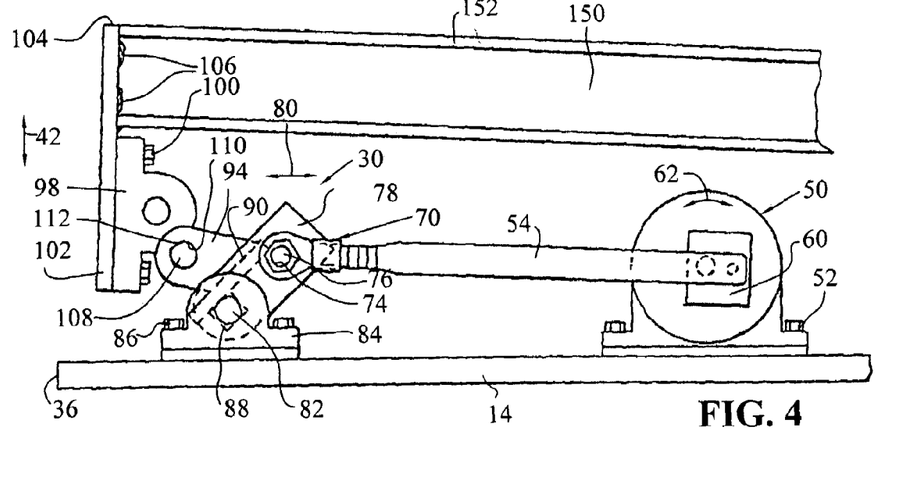
FIG. 4 is the oscillating mechanism of FIG. 3 in an actuated position.
Figure 5:
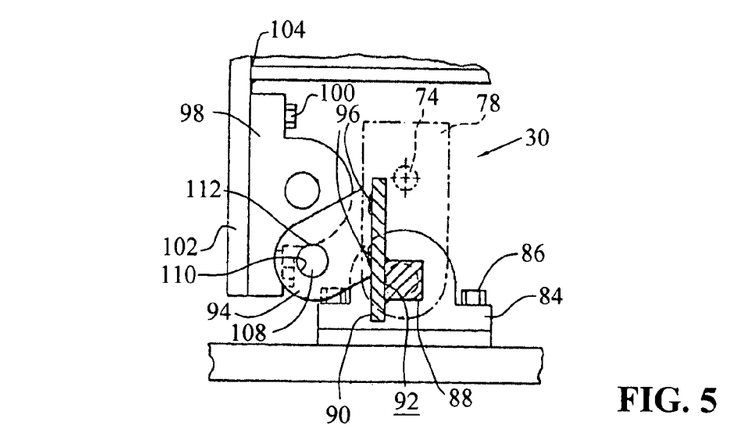
FIG. 5 is an enlarged, fragmentary view of the oscillating mechanism of FIG. 3 taken along view lines 5—5 of FIG. 3 showing the contact point with the saw support plate.
Figure 6:
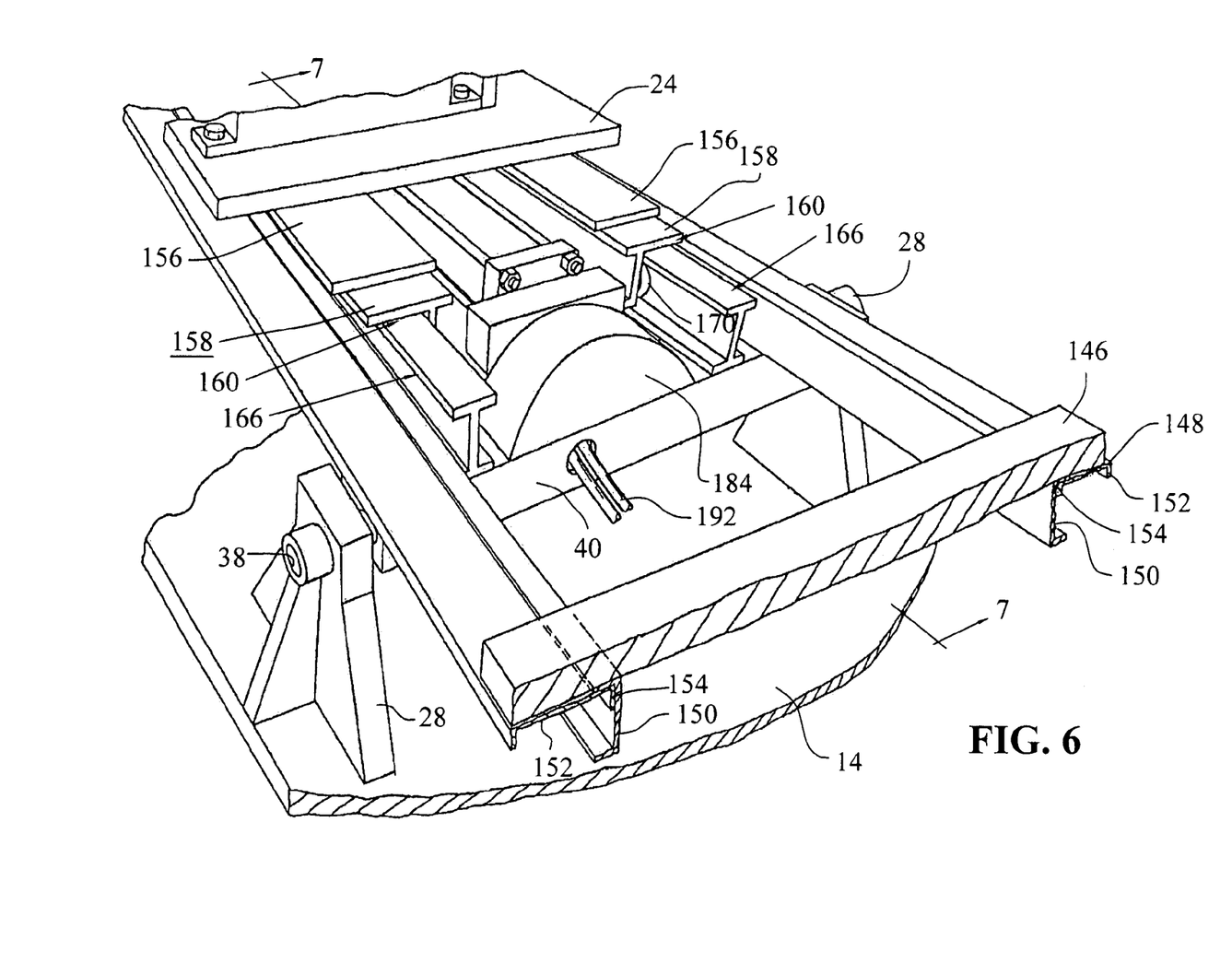
FIG. 6 is a fragmentary, perspective view of the balancing apparatus of the present invention in the advanced position.

Referring to FIGS. 3, 4 and 5, oscillating mechanism 30 along with balancing apparatus 26 prevent saw blade 46 from being in contact with metal articles such as rail 20 for substantial lengths of time which would create high temperatures causing the integrity of rail 20 to change. Secured to platform 14 by fasteners 52, oscillating motor 50 is operatively associated with oscillating mechanism 30 by connecting arm 54. Oscillating motor 50 is a motor of an appropriate size for actuating connecting arm 54 back and forth in the direction of arrow 62 and oscillating power saw 10. Motor 50 includes motor output 56 which is fixed by any suitable method such as welding or fasteners within aperture 58 located in plate 60. As motor output 56 rotates in the direction of arrow 62 plate 60 rotates as shown in FIGS. 3 and 4. Extending substantially perpendicularly from plate 60 is peg 64 which may be integrally formed with plate 60 or secured within a second aperture located in plate 60. The opposite end of peg 64 is received in aperture 66 located in end 68 of connecting arm 54. End 70 of connecting arm 54 is provided with eyebolt 72 which is threadedly secured to arm 54. Eyebolt 72 has hole 74 through its center which receives bolt 76 to fasten connecting arm 54 to plate 78 of oscillating mechanism 30. Oscillating motor 50 pivots plate 60 in the direction of arrow 62 which actuates connecting arm 54 and thus plate 78 back and forth in the direction of arrow 80. The operation of oscillating motor 50 may be variably controlled depending on the size and shape of the material being cut. This motion of plate 78 generates the oscillations of power saw 10 as will be described below.

Referring to FIG. 5, the opposite end of plate 78 from the link with connecting arm 54 is fixedly mounted on shaft 82. The ends of shaft 82 are pivotally mounted within pillow blocks 84 which are secured to platform 14 by fasteners 86. A square collar 88 is disposed on shaft 82 between pillow blocks 84. Elongated plate 90 is attached to surface 92 of collar 88 by means such as welding or brazing. Collar 88 and plate 90 are configured with respect to shaft 82 in such a manner that when oscillating mechanism 30 is in its initial position shown in FIGS. 3 and 5, plate 90 stands approximately perpendicularly to platform 14. At each end of plate 90 are members 94 which are secured to plate 90 by a pair of fasteners 96. Members 94 extend downwardly at an angle from plate 90 so as to be positioned outside of and substantially below pillow blocks 98. Pillow blocks 98 are secured by fasteners 100 to balancing apparatus end plate 102 extending downwardly and substantially perpendicular to end 104 of balancing apparatus 26. Balancing apparatus end plate 102 is secured to balancing apparatus 26 by fasteners 106. Each member 94 has one end of shaft 108 fixed within aperture 110. Shaft 108 is positioned to contact pillow blocks 98 at 112 such that as connecting arm 54 is moved away from pillow block 98 (FIG. 4), toward pivot supports 28, by oscillating motor 50, power saw 10 is forced upwardly in a direction of arrow 42 (FIG. 2). As motor 50 continues to rotate output shaft 56, plate 60 moves back and forth in the direction of arrow 62 and plate 78 in the direction of arrow 80 causing saw blade 46 to move continuously up and down in the direction of arrow 42. The distance in which saw blade 46 moves in the direction of arrow 42 is directly related to the length of connecting arm 54 including eyebolt 72 which can be adjusted by threading eyebolt 72 further onto or off of connecting arm 54. The components of oscillating mechanism 30 and connecting arm 54 are constructed from a material such as steel which is strong enough to support the weight of power saw 10 as it is oscillated.

Supported by pivot supports 28, oscillating mechanism 30, and springs 32, saw support plate 24 is fixedly mounted atop balancing apparatus 26 and supports drive motor 44 which is operatively connected to saw blade 46 through drive belt 48. Drive belt 48 is shown in FIGS. 1 and 2 as a single belt but may consist of a plurality of belts. As shown in FIG. 1, saw blade 46 is fixedly mounted between ends 114 and 116 of shaft 118. End 114 of shaft 118 is rotatably mounted in pillow block 120 which is aligned with edge 128 of supporting plate 24. End 116 of shaft 118 is rotatably mounted in pillow block 122 which is aligned with edge 124 of cutout 126. Cutout 126 is located along the front edge of saw support plate 24 to provide clearance for saw blade 46. A third pillow block 130 is aligned adjacent with edge 132 of cutout 126 so that shaft 118 is rotatably supported on both sides of saw blade 46, reducing the amount of stress on shaft 118 created during the cutting operation. End 116 passes through pillow block 130 and through aperture 134 in saw blade 46 to be received by pillow block 122. End 114 of shaft 118 extends through pillow block 120 past edge 128 of plate 24 and has gear 136 fixedly attached to end 114 by suitable methods such as welding or the like. Alternatively, shaft 118 may be similarly mounted to bottom surface 137 of saw support plate 24 if the application requires that saw blade 46 be mounted in a lower position.

Secured to the opposite end of saw support plate 24 from saw blade 46 is drive motor 44 fixed in position by fasteners 138 such as bolts or screws. Drive motor 44 is a 125 h.p. motor having output shaft 140 which extends past edge 128 of plate 24 and has gear 142 fixedly mounted to shaft 140. It is noted that motor 44 may be of any size suitable to rotate saw blade 46 at the speeds required to cut rail 20. Gear 142 aligns with gear 136, both of which being engaged by drive belt 48. As drive motor 44 rotates, output shaft 140 drives belt 48 which causes rotation of gear 142 and shaft 118. The rotation of shaft 118 is transferred to saw blade 46 to cut rail 20. Guard 144 stands substantially perpendicular from saw support plate 24 and is provided to protect motor 44 from sparks or debris created during the cutting of rail 20.

Referring to FIGS. 6, 8, 9, and 10, balancing apparatus 26 will now be discussed in greater detail. Balancing apparatus 26 maintains continuous oscillations of power saw 10 and controls vibrations produced during the cutting operation. Balancing apparatus 26 further facilitates a substantially constant cutting pressure against rail 20 as saw 10 advances, thereby equalizing pressure on saw blade 46. By equalizing pressure on blade 46 and reducing the amount of vibrations passing through saw blade 46, the life of blade 46 is extended and the cut through rail 20 is faster. In order to control the vibrations created during operation of saw 10, balancing apparatus 26 is provided with counterbalance or weight 146 at end 148. The amount of vibrations produced during the cutting operation varies, depending on the thickness and type of material such as steel or stainless steel of rail 20. Counterbalance 146 may be in the range of 400 to 1500 lbs. depending on the magnitude of the vibrations. The more severe the vibrations the more weight is required to control them.

As shown in FIGS. 6, 8, 9 and 10, counterbalance 146 is supported at end 148 by two outer, U-shaped beams or rails 150 and 152 which are welded together at 154 and extend the length of balancing apparatus 26. Saw support plate 24 is secured to spacer plates 156 which simply raise support plate 24 over the upper surface of beams 152 so that as saw support plate 24 is advanced in one direction, it does not bind with balancing apparatus 26 moving in the opposite direction. Spacer plates 156 are welded to upper surface 158 of substantially L-shaped rails 160. Leg 162 of rails 160 extends downwardly from and is approximately perpendicular to leg 164 of rails 160. A pair of stationary I-beams or rails 166 are supported at one end by beam 40 and are secured to balancing apparatus end plate 102 by fasteners 106 at the opposite end. Legs 162 along with I-beams 166 create cavities 168 in which rollers 170 are disposed. Rollers 170 are fixed to leg 162 of rails 160 by fasteners 172 and are in rolling contact with inner surfaces 180 of I-beams 166. Rollers 170 facilitate movement of saw support plate 24 and thus saw blade 46 in the direction of arrow 80 toward rail 20 (FIGS. 6, 12 and 13) and back to the initial position of FIG. 11 after the cutting operation is complete. The opposite side of I-beam rails 166 form cavities 174 with U-shaped beams 150. Rollers 176 are disposed within cavities 174 and are rotatably mounted to beams 150 by fasteners 178. Rollers 176 are in rolling contact with inner surfaces 182 of I-beams 166 for facilitating movement of counterbalance 146 in a direction opposite that of saw blade 46 during operation and back to the initial position of FIG. 11 when rail 20 is completely cut.

Referring to FIGS. 6, 7, 11, 12 and 13, hydraulic cylinder 184, well known in the art, is provided to facilitate the cutting stroke and the return stroke of saw blade 46 in both directions of arrow 80. Hydraulic cylinder 184 is supported by beam 40 at one end and includes rod 186. The end of rod 186 is secured to plate 188 downwardly extending from saw support plate 24 by connector 190. Hydraulic fluid enters hydraulic cylinder 184 through fluid lines 192 (FIG. 6), forcing rod 186 out of cylinder 184. As rod 186 is forced out of cylinder 184, saw support plate 24 is advanced toward rail 20 (FIG. 12) to the actuated position of FIG. 13. Hydraulic fluid is released from cylinder 184 to allow rod 186 to retract, returning saw support plate 24 to the initial position of FIG. 11.

Figure 7:
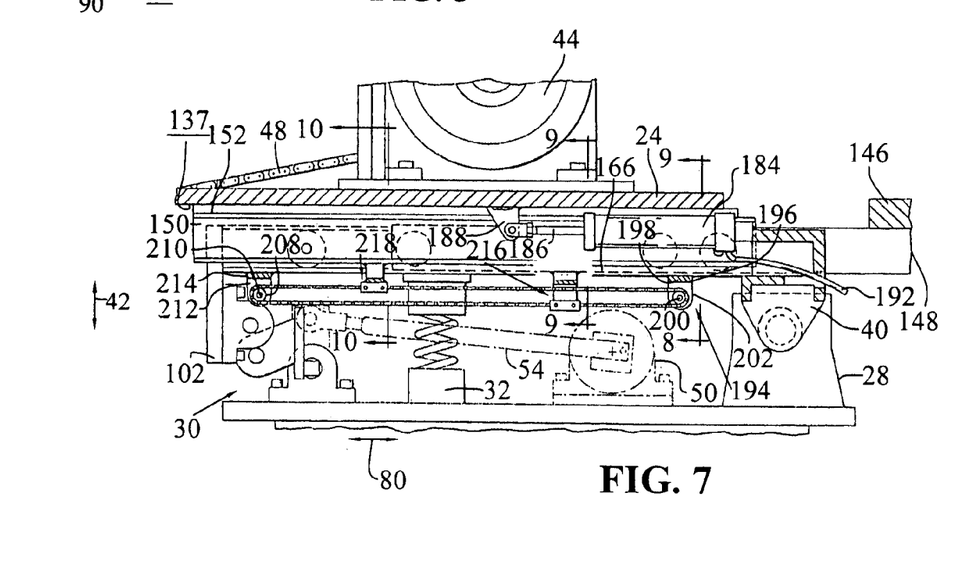
FIG. 7 is a side, sectional view of the pulley system of the present invention which advances the balancing apparatus.
Figure 8:
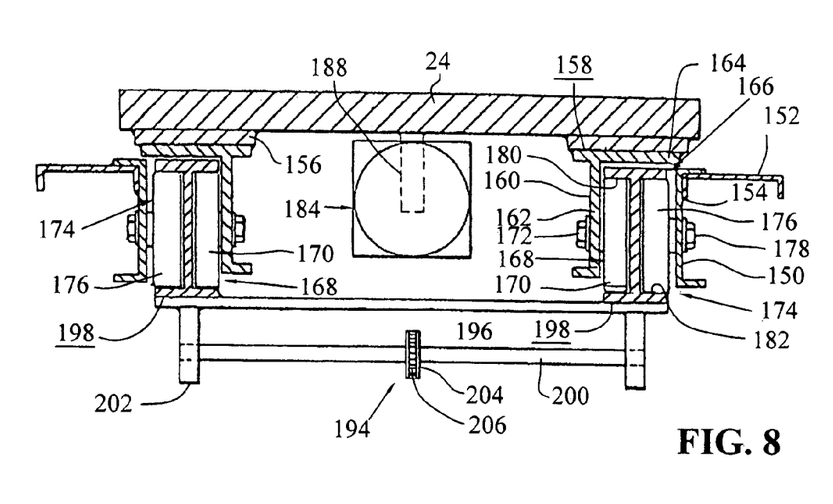
FIG. 8 is a rear, sectional view of the present invention taken along view line 8—8 of FIG. 7.
Figure 9:
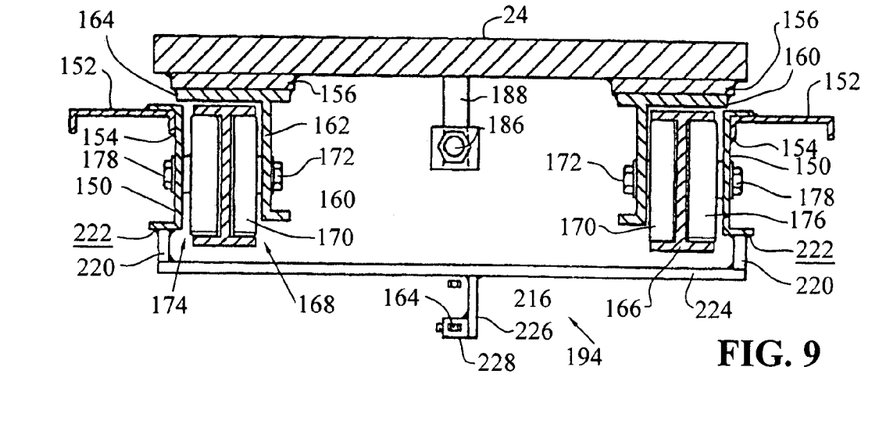
FIG. 9 is a rear, sectional view of the present invention taken along view line 9—9 of FIG. 7.
Figure 10:
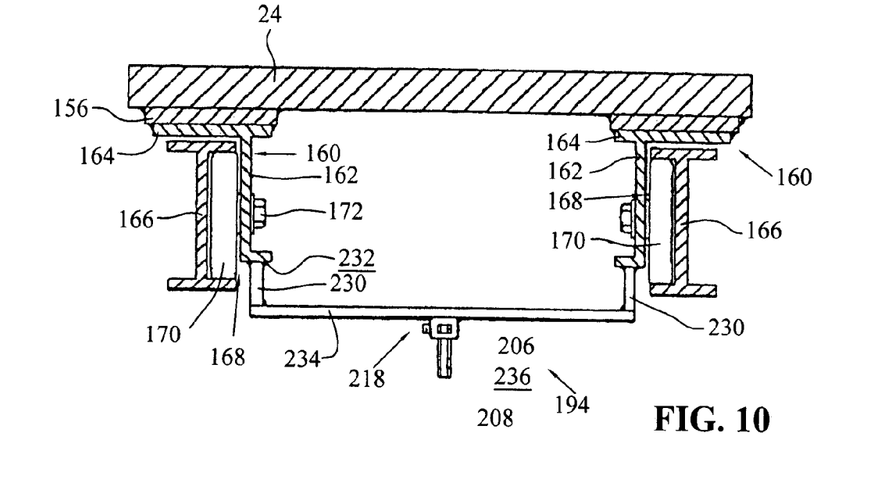
FIG. 10 is a rear, sectional view of the present invention taken along view line 10—10 of FIG. 7.
Figure 11:
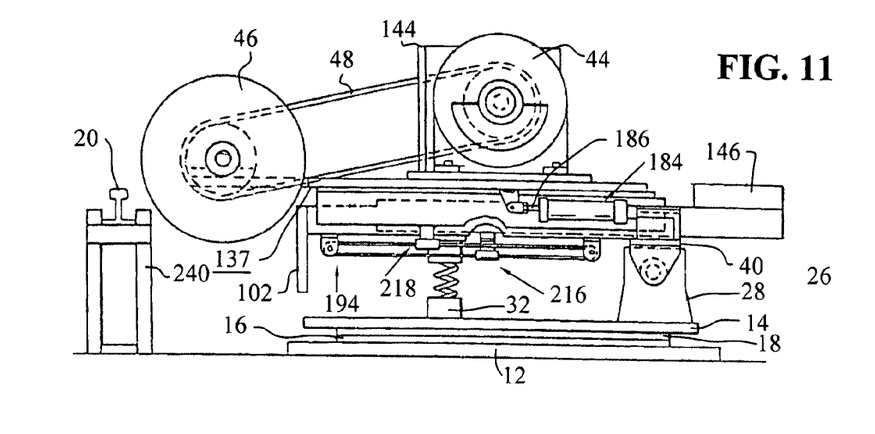
FIG. 11 is a side elevational view of the power saw of the present invention in its initial position.
Figure 12:
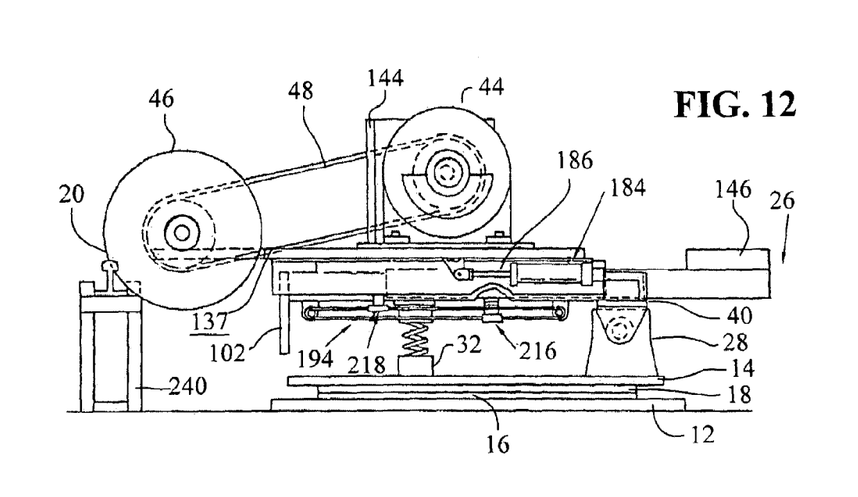
FIG. 12 is the power saw of FIG. 11 with the saw blade and balancing apparatus partially advanced.
Figure 13:
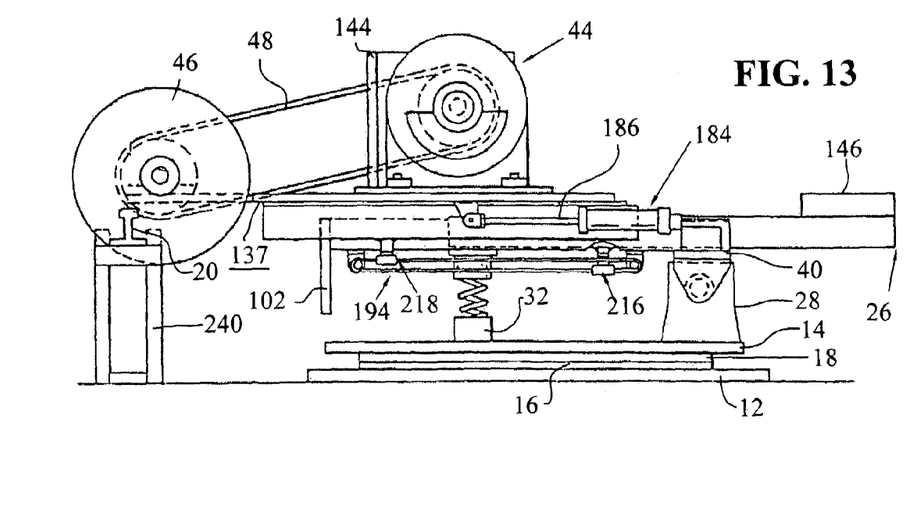
FIG. 13 is the power saw of FIG. 11 with the saw blade and balancing apparatus completely advanced.

Referring to FIG. 7, pulley assembly 194 advances balancing apparatus 26 in a direction opposite that of saw blade 46 during the cutting operation and retracts balancing apparatus 26 back to the initial position (FIG. 11) once the cutting operation is complete. Cross member 196 is welded to lower surface 198 of I-beams 166 (FIG. 8). Shaft 200 is fixed at each end to a pair of downwardly extending supports 202. At the center of shaft 200 is gear 204 which is engaged by chain 206. As shown in FIG. 7, near end 104 of balancing apparatus 26, chain 206 is also engaged on gear 208 fixed to shaft 210 supported by downwardly extending supports 212, similar to supports 202. Supports 212 are secured to cross member 214 which is welded to surface 198 of the opposite end of stationary I-beams 166. Fixedly attached to chain 206 are joints 216 and 218 which actuate chain 206 about gears 204, 208 and balancing apparatus 26 as hydraulic cylinder 184 moves saw support plate 24. Referring to FIG. 9, joint 216 includes extensions 220 which are welded to lower surface 222 of beams 150. Each extension 220 is then welded to cross member 224 to join beams 150 together so that when actuated, beams 150 advance and retract in unison. Extending downwardly from the center of cross member 224 is the support 226 for collar 228 which is fixed to chain 206 at this point. Similarly, joint 218 shown in FIG. 10 includes extensions 230 which are secured to surface 232 located on the underside of rails 160. Welded to the lower end of extensions 230 is cross member 234 which joins rails 160 such that they advance and retract in unison. Collar 236 is welded directly to cross member 234 and is fixed to chain 206. In the initial position shown in FIG. 11, joints 216 and 218 are closest together. As hydraulic cylinder 184 forces saw support plate 24 towards rail 20, joint 218 is moved toward support 212. The upper portion of chain 206 travels around gear 208 to force joint 216 closer to supports 202. This movement of joint 216 forces counterbalance 146 to move in a direction opposite that of saw support plate 24. The movement of counterbalance 146 is proportional to saw support plate 24 as shown in FIGS. 12 and 13 such that the vibrations produced during the cutting operation are dampened by the weight of counterbalance 146. The dual motion of power saw 10 in the direction of arrows 42 and 80 creates an elliptical pathway that saw blade 46 follows enabling the limited contact time between saw blade 46 and rail 20.

A second embodiment of balancing apparatus 26, pivots 28, and pulley assembly 194 of the present invention is illustrated in FIGS. 15 through 20. Balancing apparatus 244 is similar to balancing apparatus 26 in that stationary rail 246 along with rail 248 supporting saw support plate 24 create cavity 250 for rollers 252. Stationary rail 246 and rail 254 which supports counterbalance 146 define cavity 256 in which rollers 258 are disposed. Rollers 252 and 258 then facilitate movement of saw support plate 24 in a direction towards rail 20 as counterbalance 146 moves simultaneously in the opposite direction.

Figure 16:
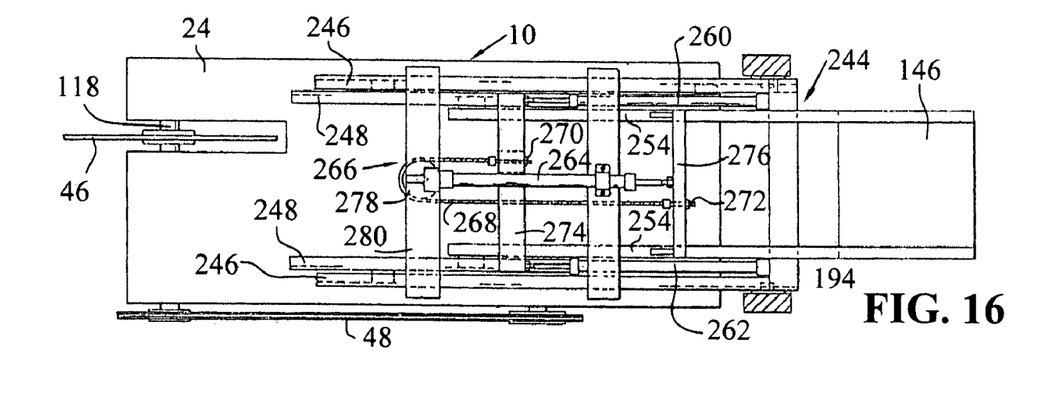
FIG. 16 is a sectional view of the pulley system and balancing apparatus taken along view line 16—16 of FIG. 15.
Figure 17:
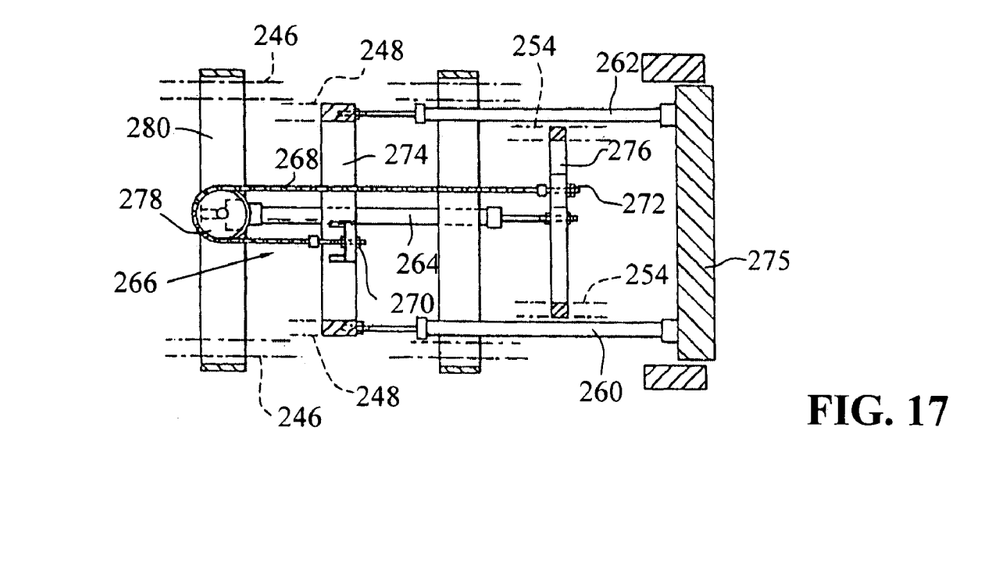
FIG. 17 is a sectional view of the pulley system and balancing apparatus taken along view line 17—17 of FIG. 15.
Figure 18:
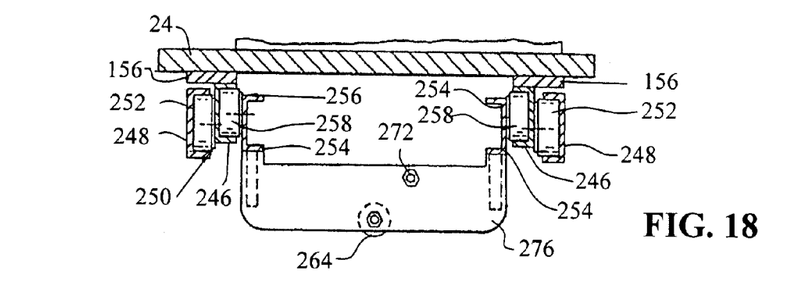
FIG. 18 is a rear, sectional view of the second embodiment of the present invention taken along view line 18—18 of FIG. 15.

In this embodiment, rails 248 are advanced by concurrent operation of a pair of hydraulic cylinders 260 and 262 which are fixed at one end to beam 274 (FIG. 20) located between rails 248 and to beam 275 situated between the ends of rails 246 at their opposite end (FIGS. 16 and 17). Rails 254 move in the opposite direction of rails 248 by a single hydraulic cylinder 264 which is secured at one end to beam 280 (FIG. 19) located between stationary rails 246 and at its opposite end to beam 276 (FIG. 18) positioned between rails 254. By incorporating two hydraulic cylinders 260 and 262 to advance saw support plate 24 and a single hydraulic cylinder 264 to move counterbalance 146, counterbalance 146 travels one-half the distance that saw support plate 24 travels, reducing the amount of space that power saw 10 requires.

Pivots 282 (FIG. 15) in the second embodiment are disposed on either side of balancing apparatus 244 and extend to a point above rails 246 and 248 of balancing apparatus 244. Pivots 282 include supports 284 which are secured at one end to platform 14. At the opposite end of supports 284 are connecting plates 286 attached to supports 284 by fasteners 288. Disposed between connecting plates 286 on each side of balancing apparatus 244 is rod 290, the ends of which are rotatably supported in connecting plates 286. Fixed to the lower portion of rod 290 is cross beam 292 which extends the length of rod 290. Downwardly extending from each end of beams 292 are connecting members 294, disposed substantially perpendicularly to beam 292 to link rod 290 and rails 246 of balancing apparatus 244. The opposite end of connecting members 294 are attached to rails 246 by fasteners 296.

Pivots 28 of the first embodiment are positioned at the lower surface of balancing apparatus 26 which causes saw blade 46 to be forced further into rail 20 as blade 46 is oscillated downwardly. By pivoting power saw 10 from a point above balancing apparatus 244, saw blade 46 is drawn backwards, away from rail 20 as it moves down into rail 20 rather than being forced forward into rail 20. In many situations, this configuration provides saw 10 with a better angle of attack on rail 20 which reduces stress of saw blade 46 and provides rail 20 with a smoother cut surface.

Pulley assembly 266 (FIGS. 16 and 17) of the second embodiment includes linear chain 268 that is fixed at each end 270 and 272 to cross beams 274 and 276, respectively.

Figure 19:
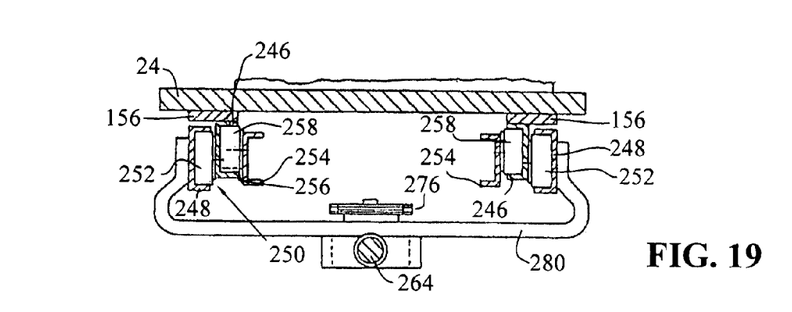
FIG. 19 is a rear, sectional view of the second embodiment of the present invention taken along view line 19—19 of FIG. 15.
Figure 20:
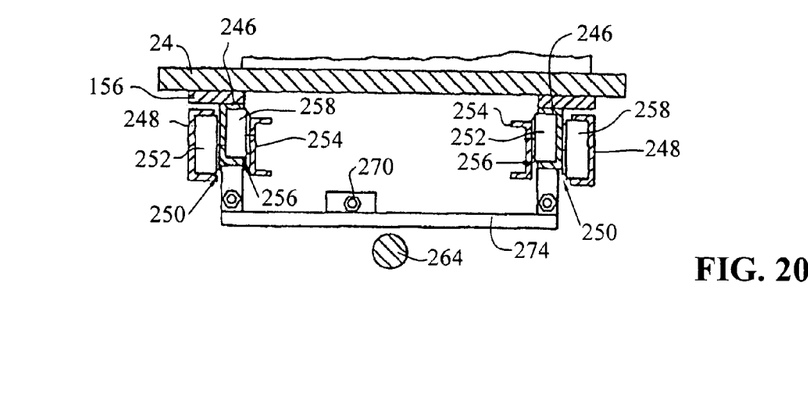
FIG. 20 is a rear, sectional view of the second embodiment of the present invention taken along view line 20—20 of FIG. 15.

Chain 268 is engaged on pulley 278 which is rotatably mounted to beam 280 secured to the outer edges of stationary rails 246 (FIG. 19). As saw support plate 24 and counterbalance 146 advance in opposite directions, the length of chain 268 between pulley 278 and beam 276 lengthens, shortening the length of chain 268 between pulley 278 and beam 274.

Figure 14:
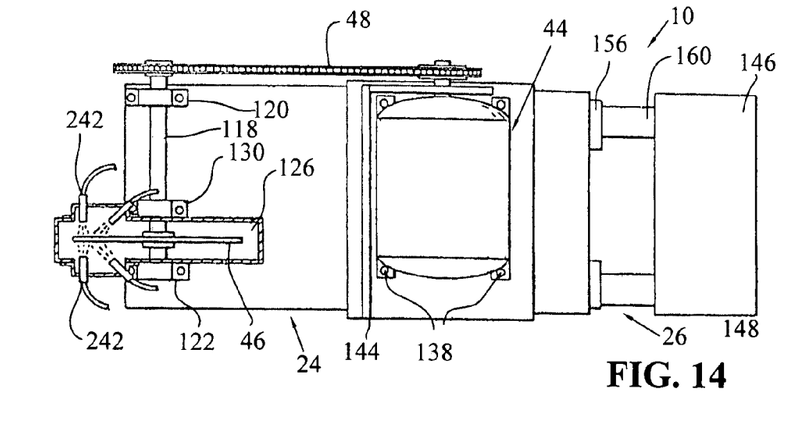
FIG. 14 is a plan view of the power saw of the present invention provided with coolant jets.
Figure 15:
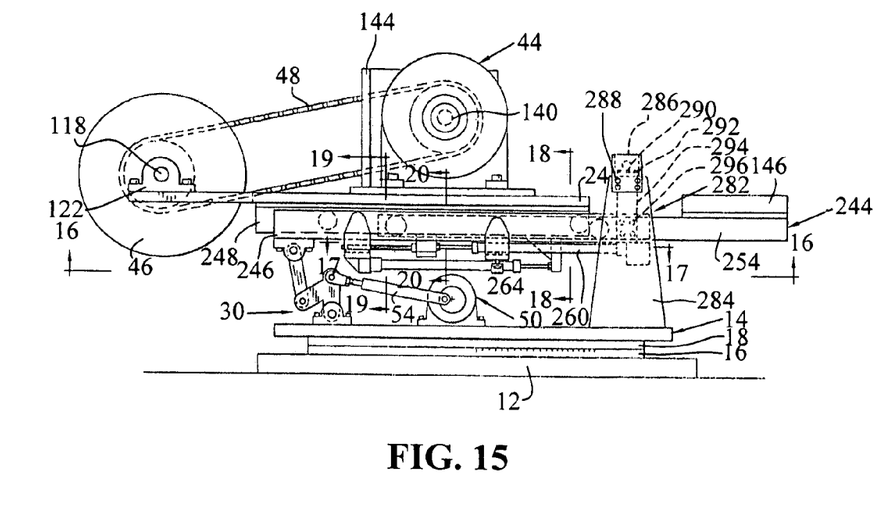
FIG. 15 is a side elevation of a second embodiment of the power saw of the present invention.

Even though not shown in the figures, covers are provided to protect the inside of saw 10 underneath saw support plate 24 and balancing apparatus 26 as well as covers for the upper portion of saw blade 46 and drive belt 48. Further, a hydraulic cylinder (not shown) may be arranged near end 238 (FIG. 1) of rail 20 to force end 238 away from the rest of rail 20 as it is being cut. When the hydraulic cylinder is actuated, it would open up the cut, reducing pressure on saw blade 46. Advancing power saw 10 is not limited to cutting steel railroad rails 20, it may be used to cut other metals such as stainless steel. Power saw 10 may also be adapted with coolant jets to reduce the temperature of rail 20 during the cutting operation. Referring to FIG. 14, a plurality of coolant jets 242 may be arranged on both sides of saw blade 46 at 45° and 90° angles to blade 46 to provide adequate coolant to reduce the temperature of rail 20.

In operation railroad rail 20 is brought a desired distance along supports 240 such that the point at which rail 20 is to be cut aligns with saw blade 46. Drive motor 44 starts rotating drive belt 48 and thus shaft 118 to begin rotation of saw blade 46. Oscillating motor 50 begins to operate driving plate 60 back and forth in the direction of arrow 62 causing connecting arm 54 and plate 78 to actuate in the direction of arrow 80. This creates contact at point 112 which raises saw support plate 24 and saw blade 46 begins the up and down motion of saw blade 46 in the direction of arrow 42. When saw blade 46 is operating at the proper speed and is oscillating in a continuous motion, rod 186 of hydraulic cylinder 184 begins to push saw support plate 24 towards rail 20. Simultaneously, counterbalance 146 of balancing apparatus 26 begins to move away from saw blade 46 so as to balance blade 46 and reduce vibrations in saw 10 during the cutting operation (FIGS. 11–13). Once saw blade 46 is completely through rail 12 as shown in FIG. 13, rod 186 of hydraulic cylinder 184 retracts bringing saw blade 46 and the balancing apparatus 26 closer together towards the initial position (FIG. 11). Oscillating motor 50 is shut off as is drive motor 44 so that advancing power saw 10 returns to the initial position of FIG. 11.

In the exemplary embodiment of power saw 10, the overall dimensions of saw 10 are approximately 10 to 12 feet long and 4 to 6 feet wide. The width of power saw 10 is dependant on the width of balancing apparatus 26, including pulley assembly 194, taken from a fork lift truck. A 125 horsepower motor is used to rotate drive belt 48 and thus saw blade 46 at a speed appropriate to cut through rails 20. Oscillation motor 50 is shown in the Figures as a 3 horsepower motor. Springs 32 of the exemplary embodiment shown in FIG. 2 are used to facilitate oscillations of saw blade 46 and are the springs used as shock absorbers in a truck. Pivot supports 28 are positioned at one end of platform 14 to support balancing apparatus 26 at a point approximately one-third the distance of balancing apparatus 26 from end 148. The opposite end of balancing apparatus 26 is supported by oscillating mechanism 30 which in relation to saw blade 46 is approximately one-third the distance of saw support plate 24 from the end of plate 24. Counterbalance 146 supported at end 148 of balancing apparatus 26 is in a range between 400 and 1500 pounds which is dependant on the amount of vibrations produced during the cutting operation. The counterbalance moves about ½ the amount of the corresponding movement of the saw blade in the exemplary embodiment.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An advancing power saw for cutting metal objects, said saw comprising:
   a platform;
   a support plate movably disposed on said platform;
   a saw blade assembly disposed upon said support plate, said saw blade assembly including a saw blade coupled with a motor and associated with an oscillating mechanism;
   a counterweight operatively associated with said support plate and arranged to move in a direction opposite to the direction said support plate moves; and
   a plurality of first and second rails, said plurality of first rails operatively connected to said support plate, said plurality of second rails operatively connected to said counterweight, whereby said first and second actuated to move rails are in opposite directions.

2. The power saw of claim 1 wherein counterweight has a sufficient mass in relation to said power saw to dampen vibrations in said power saw.

3. The power saw of claim 1 wherein counterweight has a sufficient mass in relation to said power saw to substantially equalize pressure on said saw blade.

4. The power saw of claim 1 further comprising at least one hydraulic cylinder associated with said rails.

5. The power saw of claim 1 wherein said oscillating mechanism further comprises an oscillating motor, said oscillating motor operatively associated with said oscillating mechanism by a connecting arm.

6. The power saw of claim 1 further comprising at least one pivot support disposed at one end of said platform.

7. The power saw of claim 6 wherein said pivot support is disposed beneath said rails.

8. The power saw of claim 6 further comprising a pulley assembly, said pulley assembly coupled to said counterweight and said support plate, whereby said pulley assembly advances said counterweight in a direction opposite of said support plate.

* * * * *